Oct. 8, 1957

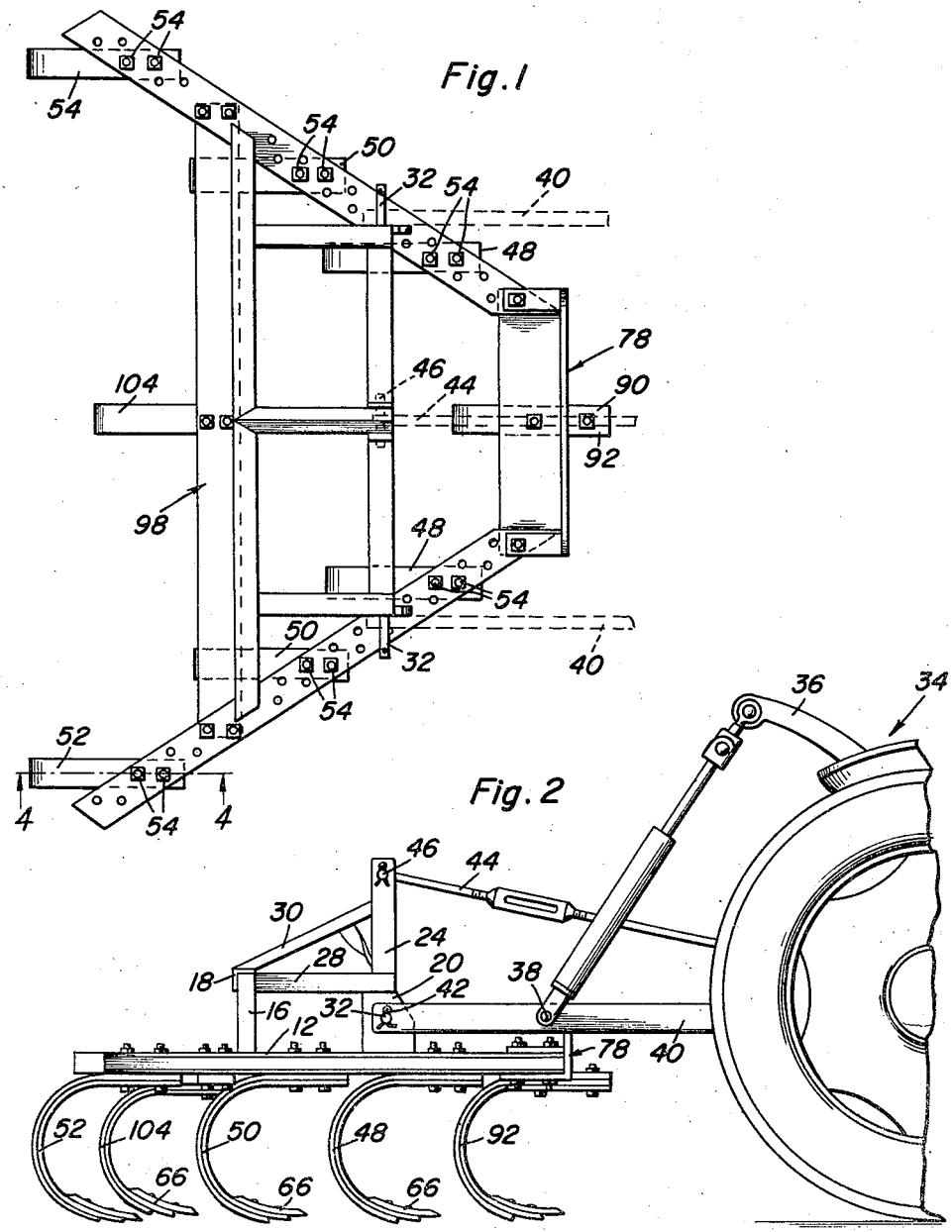

C. M. MABE 2,808,772

CULTIVATING AND PLANTING TOOL

Filed April 20, 1955

Calvin M. Mabe
INVENTOR.

United States Patent Office 2,808,772
Patented Oct. 8, 1957

2,808,772

CULTIVATING AND PLANTING TOOL

Calvin M. Mabe, Lawsonville, N. C., assignor of one-half to Alfred J. Ellington, Walnut Cove, N. C.

Application April 20, 1955, Serial No. 502,548

3 Claims. (Cl. 97—177)

This invention relates generally to farm tools and is more particularly directed to a combination laying off plow, tilling tool, and scarifying tool which utilizes a common frame attachable to majority of conventional tractors.

A further and primary object of invention in conformance with that set forth above is to provide a basic frame carried by a conventional tractor, said basic frame including means permitting the positioning and removal of a plurality of attachments for providing a cultivating tool used to perform a multiplicity of earth-working operations.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top elevational view of the novel implement, showing in dotted lines lift arms of a tractor;

Figure 2 is a side elevational view of the novel implement showing the rear portion of a tractor and the manner in which the implement is attached thereto;

Figure 3:
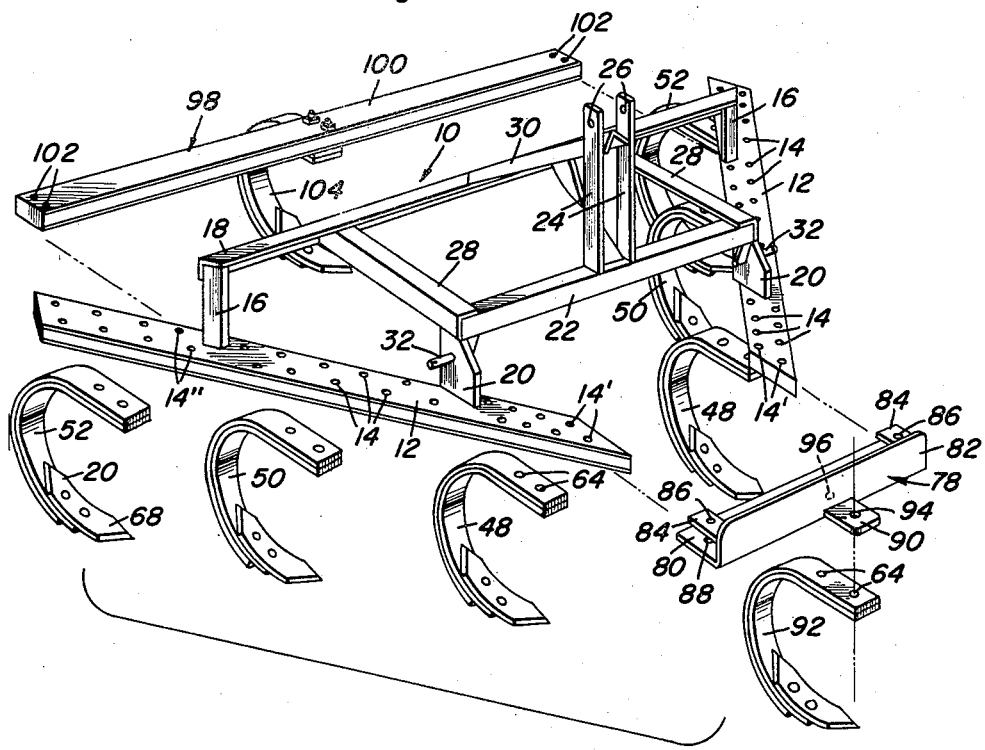
Figure 3 is an enlarged exploded perspective view of the novel implement frame and various attachments therefor.
Figure 4:
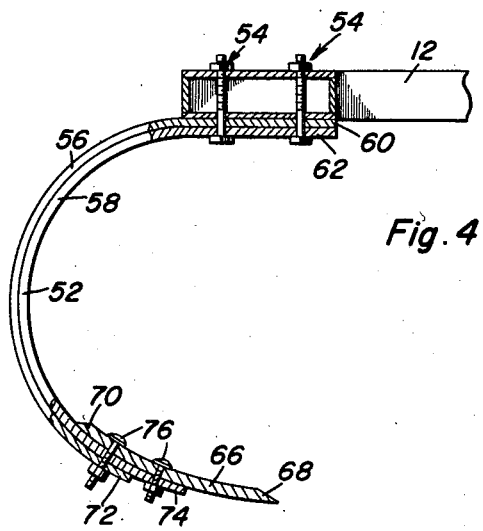
Figure 4 is an enlarged sectional view taken substantially on line 4—4 of Figure 1.

Indicated at 10, see Figure 3, is the basic frame which includes a pair of converging side frame members 12 which include extending therethrough a plurality of vertical attaching apertures 14, said apertures being located in pairs which are in general parallel alignment to the longitudinal axis of the basic frame. Secured on the upper surface of the side frame members 12 are a pair of upwardly extending supports 16 which are secured thereon in any suitable manner, by welding, for example, which have extending across their top edges a suitable transverse brace member 18. A pair of upwardly extending plates 20 are secured in oppositely disposed relationship to each of the side frame members 12 forward of the members 16 and include extending across their top ends a transverse brace member 22 which has secured in spaced relationship on a central upper portion thereof a pair of spaced connecting arms 24 which include suitable apertured portions 26. A pair of rearwardly extending brace elements 28 extend from the ends of the transverse member 22 rearwardly to the transverse member 18. An upwardly directed brace element 30 extends from the central portion of the transverse brace element 18 upwardly between the connecting arms 24. Extending outwardly from the upwardly extending plates 20 are oppositely disposed pivot pin elements 32. The heretofore mentioned structure constitutes the basic securing frame for the novel implement.

As seen in Figure 2, the tractor 34 includes a conventional lift 36 which is connected at 38 to intermediate portions of transversely spaced lift arms 40 which have rear end portions suitably apertured to receive the outwardly extending pins 32 being secured thereon by means of cotter pins 42, for example. An adjustable turnbuckle assembly 44 is secured by means of a transverse pin 46 which extends through the apertures 26 in the connecting arms 24, having the other end suitably secured to the tractor 34.

The side frame members 12 will have secured on the surface thereof by means of the pairs of aligned apertures 14, oppositely disposed pairs of ground working teeth 48, 50 and 52 which are suitably spaced on the side frame members 12, being secured there by suitable bolt and nut assemblies 54. All of the earth-working or cultivating teeth are of similar configuration and include spring steel outer curved portions 56 and an inner curved portion 58, the inner curved portion being in juxtaposition within the outer portion 56, each of said curved portions including respective upper horizontal attaching portions 60 and 62 which have aligned apertures 64 therein which will be aligned with one of the pairs of aligned apertures 14 in the frame members 12 to be secured to said frame members by means of the fastening bolt and nut assemblies 54.

A curved blade element 66 which has reversible ends 68 and 70 which is secured to the lower ends 72 and 74 of the members 56 and 58, respectively, by means of suitable nut and bolt assemblies 76. By securing on the frame only the respective pairs of teeth 48, 50 or 52 it is believed readily apparent that the individual pairs of teeth may be utilized with a basic frame for providing a "laying off" plow.

A transverse forward attaching bar 78 includes a lower flange portion 80 and a vertical flange portion 82. The flange 82 having secured on a rear side thereof a pair of spaced attaching ears 84 which extend in upward spaced relation from the lower flange 80 and include therein an aperture 86, see Figure 3, which is in alignment with an aperture 88 in the lower flange 80 of the transverse attaching element 78, the forward end portions of the frame members 12 being received between the attaching ear 84 and the flange 80 which are secured thereto by suitable bolt and nut assemblies in the apertures indicated at 14'. Extending forwardly from the attaching elements 78 is an attaching ear 90 which permits the securement of an earth-working tooth 92 of a configuration similar to those just described, by means of spaced apertures 64 therein which will be in alignment with spaced apertures 94 and 96 contained in the attaching ear 90 and flange 80, respectively. It is believed readily apparent that by attaching the elements 78 and the tooth 92 to the forward portion of the basic frame, as just described, the user has available a suitable tilling tool.

A rear transverse attaching element 98 which includes an elongated bar 100 having pairs of vertical apertures 102 at its opposite ends is attachable to the underside of the side frame members 12 and the pair of apertures indicated at 14", see Figure 3. The rear attaching element 98 includes attached to its undersurface an earth-working tooth 104 which is similar in construction to the previously described teeth.

It is believed readily apparent that by attaching the element 98 in the manner just described to the basic frame, there is provided in conjunction with the other earth-working teeth a suitable cultivating or scarifying tool made available without necessitating the removal of the basic cultivating frame from the tractor.

It is believed readily apparent that there has been disclosed a cultivating and planting implement which fully conforms with the objects of invention heretofore set forth.

Various positional directional terms such as "top," "bottom," "rear," etc., are utilized herein to have only a relative connotation and are not intended to require any particular orientation of the device with respect to any external elements.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A combination earth-working tool adapted to be drawn by tractor, said tool comprising a pair of forwardly converging frame members, a transverse attaching bar at the forward ends of said frame members, said attaching bar being angular in section and including an upstanding flange and an approximately horizontal flange on which said frame members are disposed, means including brackets that are parallel to said horizontal flange for fastening said frame members to said attaching bar, an attaching ear protruding from said attaching bar, an earth-working tool secured to said attaching ear, said attaching ear being on the longitudinal central axis of the combination earth-working tool, at least two transverse brace members, means mounting said transverse brace members above said frame members, the last-mentioned means having means to attach to a tractor draft, structural means interconnecting said brace members and secured to each, an upstanding pair of connecting arms secured to at least one of said brace members to which another portion of the draft from the tractor is adapted to attach, a rear attaching element extending transversely across said frame members and secured to each, said rear transverse attaching element being in a different plane from said brace members and adapted to support an earth-working tool in alignment with the earth-working tool on said attaching ear.

2. The combination earth-working tool of claim 1, together with additional earth-penetrating tools carried in spaced relationship on said frame members.

3. The combination of claim 2 wherein said rear transverse attaching element, said forward attaching bar, and the earth-working tools are bolted to said frame members.

References Cited in the file of this patent

UNITED STATES PATENTS

| | | |
|---|---|---|
| 557,080 | Morley | Mar. 24, 1896 |
| 656,988 | Magee | Aug. 28, 1900 |
| 723,380 | Graves | Mar. 24, 1903 |
| 1,162,068 | Johnson | Nov. 30, 1915 |
| 1,336,421 | Burke | Apr. 13, 1920 |
| 2,156,729 | Krause | May 2, 1939 |
| 2,336,152 | Rude | Dec. 7, 1943 |
| 2,562,486 | Denning | July 31, 1951 |